United States Patent [19]
Staiger

[11] 3,713,709
[45] Jan. 30, 1973

[54] RESILIENT AXLE LINING DUST GUARD

[75] Inventor: William C. Staiger, Erie, Pa.

[73] Assignee: General Electric Company

[22] Filed: Nov. 18, 1971

[21] Appl. No.: 199,969

[52] U.S. Cl. ............................. 308/36.1, 295/36 R
[51] Int. Cl. ....... B60b 35/00, F16c 33/72, F16j 15/02
[58] Field of Search ..... 277/138, 147, 157; 295/36 R; 308/36.1

[56] References Cited

UNITED STATES PATENTS

| | | |
|---|---|---|
| 2,783,067 | 2/1957 | Foss ................................. 308/36.1 X |
| 3,127,222 | 3/1964 | Hanson ............................. 308/36.1 |
| 3,307,885 | 3/1967 | Cox .................................. 308/36.1 |
| 3,433,541 | 3/1969 | Drabik .............................. 308/36.1 |

Primary Examiner—Gerald M. Forlenza
Assistant Examiner—Howard Beltran
Attorney—Walter C. Bernkopf et al.

[57] ABSTRACT

A dust guard seal for bridging the axial gap between an annular thrust flange of a traction motor cylindrical bearing and the hub of a locomotive wheel supported by the bearing. A cylindrical elastomeric collar has near its one end an adjustable band circumferentially securing it to the thrust flange, and near its other end a felt ribbon on its inner circumference to frictionally engage the wheel hub surface, thereby preventing the entrance of dirt particles into the axial gap.

6 Claims, 4 Drawing Figures

PATENTED JAN 30 1973 3,713,709

3,713,709

RESILIENT AXLE LINING DUST GUARD

BACKGROUND OF THE INVENTION

This invention relates generally to seals for traction motor support bearings and more particularly to a dust guard removably secured to the bearing thrust flange to bridge the axial gap to the hub of an axially mounted wheel.

Propulsion of a diesel locomotive is accomplished by individual electric traction motors geared to the axles which are supported by bearings. It is well-known in the art to provide a dust guard on the traction motor support bearing at the commutator end thereof to prevent dirt and other foreign matter from entering into the bearing regions and contaminating the lubricant.

A conventional arrangement involves a U-shaped annulus secured at its one side to the circumference of the bearing and frictionally engaging at its other side of the wheel hub surface. The manner in which the annulus is secured to the bearing, and the manner in which frictional engagement is maintained with the hub, however, are matters in which considerable difficulty has arisen.

Early methods of mounting the guard included that of forming the U-shaped frame integrally with the support bearing. This arrangement eliminated problems caused by vibration, but offered certain other disadvantages which rendered it impractical as a solution. The expense of manufacture along with the necessity of replacing the entire unit when either portion became excessively worn was prohibitive.

A separate dust guard held in place by screws, pins, or clamps, proved in some cases to be unsatisfactory due to the difficulty in assemblage and to the loosening thereof by vibratory action. Another difficulty precipitated by vibrations was the susceptibility of failure of the U-shaped elements with resulting downtime and possible additional damage if neglected.

The nature of the frictionally engaging sealing surface on the periphery of the wheel hub has taken a number of different forms. Felt, or the like, has long been employed as a sealing material for direct engagement with a rotating member. Its characteristic compressibility provides the compressive force to sufficiently maintain contact with the hub surface, and its resistance to wear provides for long lasting service before leakage occurs. However, to obtain the necessary compressibility for lasting wear, a reasonably thick section in the radial direction is required, thus necessitating axially spaced support flanges on either side thereof to provide axial stability.

An alternate approach, wherein an elastomeric member provides a compressive force, solves the problem of vibrations due to its resilient properties. However, the requirement for lasting compressive contact is likely to be more important, and excessive wear of the elastomeric member may render it unsatisfactory.

It is therefore an object of this invention to provide an improved dust guard for easy installation on the thrust flange of a motor axle bearing.

Another object of this invention is the provision for a dust guard which is not affected by vibrations of the wheel and supporting bearing.

A further object of this invention is the provision in a dust guard for a seal wear surface which is compressible and substantially wear resistant.

Still another object of this invention is the provision for a lasting bias to maintain a compressive force on the sealing element of an axle lining dust guard.

Yet another object of this invention is the provision for an axle lining dust guard which is economical to manufacture, extremely functional to use, simple to install and durable in service.

These objects and other features and advantages become more readily apparent upon reference to the following description when taken in conjunction with the appended drawings.

SUMMARY OF THE INVENTION

This invention is a dust guard comprising an elastomeric cylindrical band, an adjustable metal band to secure the elastomeric band circumferentially around an axle bearing thrust flange, and a felt tape compressibly and frictionally biased against the radial periphery of a wheel hub by the inner circumference of the elastomeric band. The elastomeric band, which bridges the axial gap between the thrust flange and the wheel, is not affected appreciably by vibrations, and can be easily installed as an annular member having a single circumferential split. It provides a lasting radially inward biasing force against the felt ribbon to maintain the sealing contact against the hub surface. The felt tape which is resistant to wear and which requires no axial support because of its relatively small radial thickness, may receive lubrication from an annular inner air gap which surrounds the axial gap between the wheel and thrust flange, thereby providing for longer wear and better sealant qualities.

In the drawings as hereinafter described, a preferred embodiment and a modified embodiment are depicted; however, various other modifications and alternate construction can be made thereto without departing from the true scope and spirit of the invention.

DESCRIPTION OF THE PREFERRED EMBODIMENT

Figure 1:
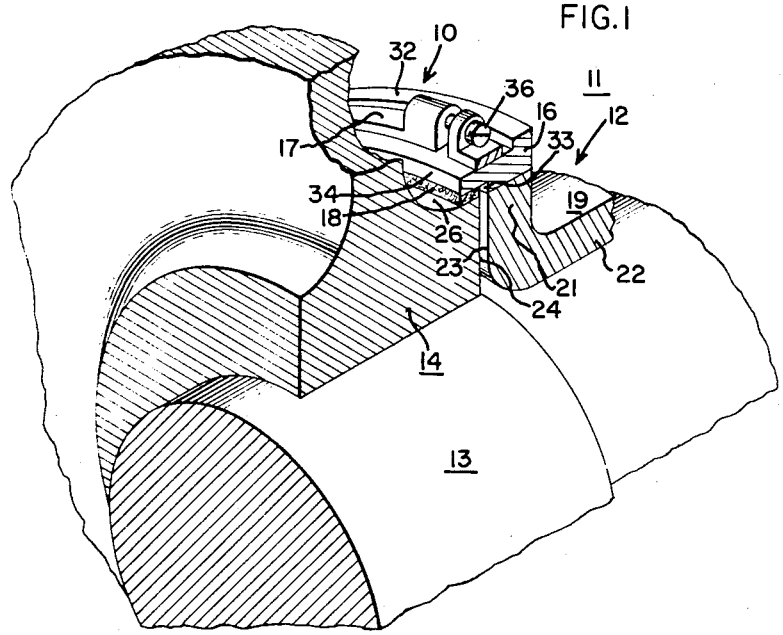
FIG. 1 is a partial perspective view of the preferred embodiment as installed in combination with a wheel and thrust flange.

Reference is now made to FIG. 1 which shows the dust guard 10 in its installed relationship with a conventional diesel locomotive traction motor 11, an associated bearing 12, a supported axle 13 and a driven wheel 14. The dust guard 10 comprises an elastomeric cylindrical band 16, an adjustable securing band 17, and a sealing annulus 18, and has for its purpose the prevention of dirt particles from entering into the area of the bearing wear surfaces.

The bearing 12 comprises a cylindrical sleeve 19 projecting outwardly from the traction motor housing and terminating in a radially outwardly projecting thrust flange 21. The sleeve portion 19 has a bearing wear surface 22 in rotational contact with the axle 13, and the thrust flange portion 21 offers an axially facing thrust surface 23 that cooperates with an opposed complementary thrust surface 24 on the wheel 14. A lubricant is normally disposed between these respective frictional surfaces and to prevent any undue wear thereof the lubricant must be kept free of contaminates. The dust guard 10 accomplishes this by providing a circumferential seal around the area with the cylindrical band 16 securely fixed to the periphery of the thrust flange 21 and the sealing annulus frictionally and sealingly engaging the radially outwardly facing hub surface 26 of the wheel 14.

Figure 2:
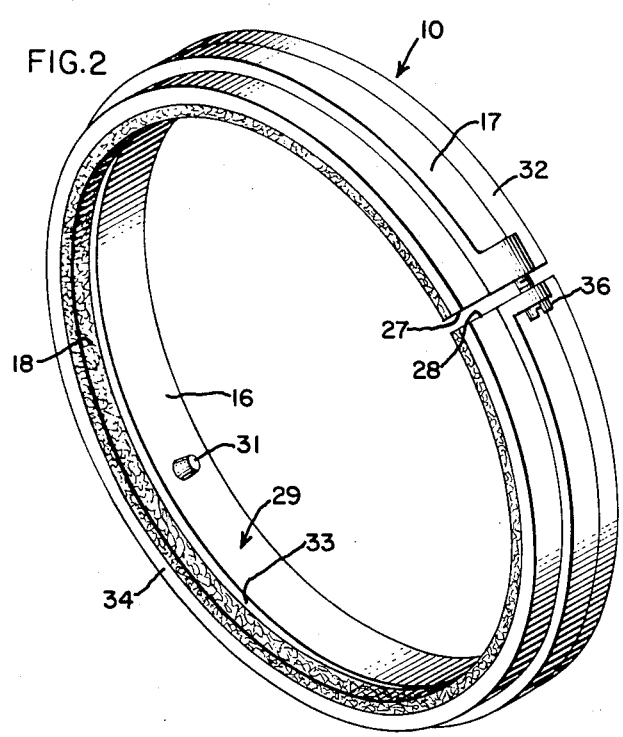
FIG. 2 is a perspective view thereof in a free condition.

The dust guard 10 is shown in its removed state in FIG. 2. Its design allows installation or replacement on a locomotive without removal of the motor 11 or wheel 14.

The cylindrical band 16 is a single split resilient member having circumferentially spaced end surfaces 27 and 28 which are biased into abutting relationship to provide a continuous annular band when placed in the installed position. The inner diameter of the cylindrical band 16 is substantially equal to the outer diameter of the thrust flange 21 so as to establish the proper sealing fit between the two members. The composition of the cylindrical band 16 is of a resilient material which allows the band to be freely opened to accommodate installation and which is springy in nature so as to allow a slight biasing force to be exerted on the wheel hub surface 26 by the relative circumferential relationship. The composition is preferably of an elastomeric material whose coefficient of friction is sufficient to provide an adequate frictional engagement between the band inner surface 29 and the periphery of the thrust flange 21, so as to substantially eliminate any relative movement therebetween after installation of the dust guard. A radially inwardly protruding stud 31 may be provided on the inner surface of the band 16 for relative engagement with a corresponding hole (not shown) in the thrust flange 21 to circumferentially position the dust guard so as to position the split at the same place each time and thereby simplify the removal and replacement thereof.

The width of the cylindrical band 16 in the axial direction is greater than that of the thrust flange 21 so that a portion thereof overlaps over the wheel hub surface 26. An annular rib 32 is formed on the periphery of the band 16 at the motor end thereof, to abut the side wall of the motor housing on one side thereof, and to provide an axial positioning reference for the securing band 17 on the other side thereof. The rib 32 ensures that the securing band is positioned concentrically with respect to the cylindrical band 16 and that it will not slip off while in the installed position.

The end of the cylindrical band which extends over the wheel hub surface 26 has formed therein an annular indent 33 in the inner diameter thereof (FIGS. 1 and 2), for the placement of the sealing annulus 18 therein. The axial width of the indent 33 extends to the wheel side edge 34 of the band 16 and the sealing annulus 18 is secured therein. The sealing annulus 18 is a single split member with circumferentially spaced end surfaces which are substantially flush with the cylindrical band end surfaces 27 and 28 (FIG. 2). It is composed of a compressible, absorbent material such as felt or the like and is secured to the indent 33 by an adhesive or the like.

The securing band 17 is of a type commonly used, such as a hose clamp, and is adjustable by means of an adjusting screw 36 which will allow the band to part for purposes of installation.

Figure 3:
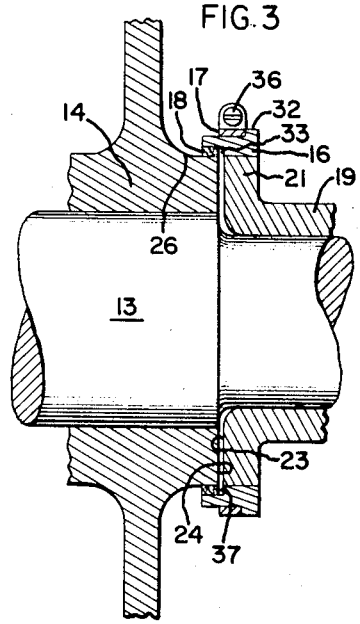
FIG. 3 is a partial cross-sectional view of the assembly shown in FIG. 1.

In accordance with the preferred embodiment of FIG. 3 the outer diameter of the wheel hub 26 is substantially equal to that of the thrust flange 21. In order to provide the proper sealing fit the radial thickness of the sealing annulus is then substantially equal to or slightly greater than the radial depth of the annular indent 33, thus providing a sealant relationship between the sealing annulus 18 and the hub surface 26. A compressive force is circumferentially applied to the sealing annulus 18 by the overlapping portion of the cylindrical band 16, which portion is slightly stressed by the tightening of the adjustable band 17. As the felt sealing annulus wears with continued use its compressibility, along with the resiliency of the overlapping portion, will allow a compressive force to be maintained against the wheel hub surface 26 and thereby maintain the proper protection against the entry of contaminates.

As illustrated in FIG. 3 the axial width of the sealing annulus is less than that of the annular indent 33, thereby providing an annular air slot 37 adjacent the axial gap defined by surfaces 23 and 24. This free space is provided so that no particles or materials, such as that from the felt annulus, will contact the mating parts or tend to enter the space between the surfaces 23 and 24. However, the sealing annulus 18 is exposed to the air slot 37 so as to allow the lubricant to be attracted by capillary action. The lubricant not only provides for reduced frictional operation, but also provides for improved sealing characteristics for the sealing annulus 18.

Figure 4:
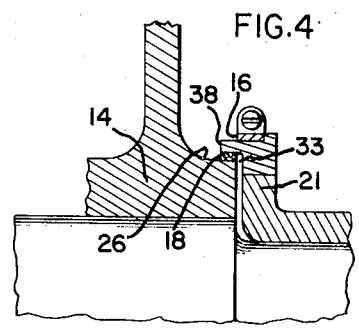
FIG. 4 is a partial cross-sectional view of a modified embodiment of the dust guard.

A modified embodiment is illustrated in FIG. 4 wherein the outer diameter of the wheel hub surface 26 is greater than that of the thrust flange 21. The radial thickness of the cylindrical band 16 through the portion surrounding the thrust flange 21 is greater than that of the preferred embodiment to allow the overlapping portion 38 to be positioned in the proper radial relationship to the wheel hub surface 26. The radial depth of the annular indent 33 is accordingly greater than in the preferred embodiment and the thickness of the sealing annulus 18 in the radial direction is substantially less than the radial depth of the annular indent.

What I claim as new and desire to secure by Letters Patent of the U.S. are:

1. An axle lining dust guard for bridging the axial gap between an annular thrust flange of a cylindrical bearing and the hub of a wheel supported by the bearing, the dust guard comprising:

a. a resilient cylindrical band having a single split, and circumferentially spaced end surfaces, an inner diameter substantially equal to the outer diameter of the thrust flange, a width substantially greater than that of the thrust flange to allow an axial overlap over the wheel hub surface, and an annular indent in the inner diameter of the portion overlapping the wheel hub surface;

b. a sealing annulus of a compressible material secured in said indent, said annulus having a single split and circumferentially spaced end surfaces substantially flush with said cylindrical band end surfaces; and c. means for circumferentially securing said cylindrical band to said thrust flange so as to cause said sealing annulus to compressively and circumferentially engage said wheel hub surface.

2. An axle lining dust guard as set forth in claim 1 wherein the thickness of said sealing annulus is substantially the same dimension as the radial depth of said annular indent.

3. An axle lining dust guard as set forth in claim 1 wherein the width of said sealing annulus is less than the dimension of the axial width of said annular indent, whereby an axial air gap exists between said sealing annulus and the portion of said cylindrical band surrounding said thrust flange.

4. An axle lining dust guard as set forth in claim 1 wherein said sealing annulus is composed of an absorbent material for retaining a lubricant, thereby increasing the sealant effect and the wear life of said sealing annulus.

5. An axle lining dust guard as set forth in claim 1 and including means for circumferentially positioning said cylindrical band with respect to said thrust flange.

6. An axle lining dust guard as set forth in claim 1 wherein said means for circumferentially securing said cylindrical band to said thrust flange is an adjustable band and wherein means are provided on the periphery of said cylindrical band for relative axial positioning of the adjustable band.

* * * * *